2,798,881

4-(AMINOARYL)-1,3-BUTADIENE-2-CARBONITRILES AND THEIR PREPARATION

Donald Robert Baer, Wilmington, Del., and Richard Edwin Heckert, Richmond, Va., assignors to E. I. du Pont de Nemours & Company, Wilmington, Del., a corporation of Delaware No Drawing. Application November 12, 1954, Serial No. 468,582

5 Claims. (Cl. 260—465)

This invention relates to dyes and more particularly to a new class of amino substituted dyes and to a process for their preparation.

It is highly desirable for commercial purposes to have available within a given chemical type a full range of colors so that a single chemical procedure can be adapted for applying a full color range of dyes. In such an effort it frequently occurs that dyes which absorb light of shorter wave lengths (yellow and orange dyes) are more readily obtained than those which absorb light of longer wave lengths (blue and violet dyes).

This invention has as an object the provision of a new class of chemical compounds. A further object is the provision of a new class of dyes. Still another object is the provision of new dyes having maximum light absorption at wave lengths at least 50 millimicrons higher than the value for their precursors. Other objects will appear hereinafter.

These objects are accomplished by the present invention of 4-(aminoaryl)-1,3-butadiene-2-carbonitriles having the amino group separated from the butadienyl substituent by an even number, from two to four, of annular carbons, preferably ortho or para to the butadienyl substituent. These compounds are characterized by maximum light absorptions at wave lengths at least 50 millimicrons higher than the values for their respective 4-(aminoaryl)-1,3-butadiene precursors. Another aspect of the invention is the process wherein 4-(aminoaryl)-1,3-butadienes are hydrocyanated to yield 4-(aminoaryl)-3-butene-2-carbonitriles which are then subjected to oxidative dehydrogenation to yield the corresponding 4-(aminoaryl)-1,3-butadiene-2-carbonitriles.

In a preferred embodiment of this invention a solution of an aminoaryl butadiene such as 4-(p-aminoaryl)-1-carbalkoxy-1-cyano-1,3-butadiene in an organic solvent is treated with hydrogen cyanide in a basic medium, e. g., concentrated aqueous alkali cyanide to effect the addition of hydrogen cyanide and form the corresponding 4-(p-aminoaryl)-1-carbalkoxy-1-cyano-3-butene-2-carbonitrile. This intermediate compound may be isolated and purified if desired. Whether isolated or not, the intermediate 3-butene-2-carbonitrile is acidified and dehydrogenated by the action of an oxidizing agent to yield a 4-(p-aminoaryl)-1-carbalkoxy-1-cyano-1,3-butadiene-2-carbonitrile.

The following examples in which parts are by weight are illustrative of the invention.

EXAMPLE I

Part A

A solution of 525 parts of p-dimethylaminocinnamaldehyde [König, Schramek and Rösch, Ber. 61B, 2074–80 (1928)], 198 parts of malononitrile, 10 parts of piperidine and 30 parts of acetic acid in 2360 parts of ethanol is heated at reflux temperature for 15 minutes. Filtration of the cooled mixture gives 590 parts of 4-(p-dimethylaminophenyl)-1,3-butadiene-1,1-dicarbonitrile, M. P. 146–147° C. The light absorption spectrum of an acetone solution of this compound shows a maximum absorption at 483 millimicrons with a molecular extinction coefficient of 43,000.

Part B

A solution of 447 parts of 4-(p-dimethylaminophenyl)-1,3-butadiene-1,1-dicarbonitrile in 4723 parts of dimethylformamide is stirred under nitrogen at 25° C. while 650 parts of 4 N aqueous sodium cyanide is gradually added. The resulting, nearly colorless solution is stirred for 4 minutes and 7500 parts of acetic acid is added, followed by 887 parts of lead tetraacetate. The mixture is stirred 5 minutes and poured into 50,000 parts of a well-stirred mixture of ice and water. Filtration gives 382 parts of 4-(p-dimethylaminophenyl)-1,3-butadiene-1,1,2-tricarbonitrile which is purified by recrystallization from xylene; M. P. 235–238° C. The light absorption spectrum of an acetone solution of this compound shows a maximum of absorption at 582 millimicrons with a molecular extinction coefficient of 63,900.

Analysis.—Calculated for $C_{15}H_{12}N_4$: C, 72.6%; H, 4.9%; N, 22.6%. Found: C, 72.4%; H, 4.7%; N, 22.6%.

When 124 parts of 4-(p-dimethylaminophenyl)-1,3-butadiene-1,1,2-tricarbonitrile is refluxed for twelve minutes with 7500 parts of ethanol and 750 parts of 2.5 N sodium hydroxide and the resultant solution is cooled and acidified, 67 parts of a blue solid is formed. The solid is separated and refluxed for fifteen hours with 3500 parts of methanol saturated with hydrogen chloride. The resultant solution is dissolved in 10,000 parts of water, and sufficient 10% sodium carbonate is added to neutralize the hydrogen chloride. There is obtained a yellow solid from which 16 parts of methyl p-dimethylaminocinnamate, M. P. 137–138° C., is isolated by sublimation at 0.2–0.7 mm. pressure (pot temperature 100–115° C.) followed by recrystallization from methanol. The methyl p-dimethylaminocinnamate is identified by direct comparison of its melting point and X-ray diffraction pattern with those of an authentic sample made by the procedure of Pfeiffer and Haefelin, Ber., 55, 1769 (1922).

When 4-(p-dimethylaminophenyl)-1,3-butadiene-1,1,2-tricarbonitrile is applied as a dye to "Orlon" acrylic fiber, it imparts a deep blue color. On "Dacron" polyester fiber, it produces a blue-violet color. 4-(p-dimethylaminophenyl)-1,3-butadiene-1,1,2-tricarbonitrile is characterized by excellent hydrolytic stability at pH values in the range from 3 to 6: it is only 5% hydrolyzed after 22 hours in a boiling aqueous dispersion at pH 4.

EXAMPLE II

Part A

Benzoylacetonitrile is substituted for malononitrile in Part A in Example I and there is obtained 1-benzoyl-4-(p - dimethylaminophenyl) - 1,3-butadiene-1-carbonitrile. The light absorption spectrum of an acetone solution of this compound shows a maximum of absorption at 486 millimicrons with a molecular extinction coefficient of 43,800.

Part B

By a process similar to that of Part B in Example I, 1-benzoyl-4-(p-dimethylaminophenyl)-1,3-butadiene-1-carbonitrile is converted to 1-benzoyl-4-(p-dimethylaminophenyl)-1,3-butadiene-1,2-dicarbonitrile, M. P. 115–120° C.. This compound gives blue dyeings on hydrophobic fibers. The light absorption spectrum of an acetone solution of this compound shows a maximum absorption at 569 millimicrons with a molecular extinction coefficient of 8,500.

Analysis.—Calculated for $C_{21}H_{17}N_3O$: C, 77.0%; H, 5.2%; N, 12.8%. Found: C, 73.4%; H, 5.4%; N, 12.1%.

EXAMPLE III

Part A

Cyanoacetanilide is substituted for malononitrile in the procedure of Part A of Example I and there is obtained 4-(p-dimethylaminophenyl)-1-phenylcarbamyl-1,3-butadiene-1-carbonitrile, M. P. 239–241° C. The light absorption spectrum of an ethanol solution of this compound shows a maximum absorption at 455 millimicrons with a molecular extinction coefficient of 31,700.

Part B

By a procedure similar to that of Part B in Example I, 4-(p-dimethylaminophenyl) - 1 - phenylcarbamyl - 1,3-butadiene-1-carbonitrile is converted to 4-(p-dimethylaminophenyl) - 1 - phenylcarbamyl-1,3-butadiene-1,2-dicarbonitrile, M. P. 220–225° C. This compound gives blue dyeings on hydrophobic fibers. The light absorption spectrum of an acetone solution of this compound shows a maximum absorption at 551 millimicrons with a molecular extinction coefficient of 9,600.

*Analysis.*—Calculated for $C_{21}H_{18}N_4O$: C, 73.7%; H, 5.3%; N, 16.4%. Found: C, 70.1%; H, 5.3%; N, 12.9%.

EXAMPLE IV

Part A

In the procedure of Part A of Example I ethyl cyanoacetate is substituted for malononitrile and p-diethylaminocinnamaldehyde is substituted for p-dimethylaminocinnamaldehyde and there is obtained 1-carbethoxy-4-(p-diethylaminophenyl)-1,3-butadiene-1 - carbonitrile. The light absorption spectrum of an acetone solution of this compound shows a maximum absorption at 425 millimicrons with a molecular extinction coefficient of 47,000.

Part B

By a procedure similar to that of Part B in Example I, 1-carbethoxy-4-(p-diethylaminophenyl)-1,3-butadiene-1 - carbonitrile is converted to 1 - carbethoxy-4-(p-diethylaminophenyl)-1,3-butadiene-1,2-dicarbonitrile. This compound gives red dyeings on hydrophobic fibers. The light absorption spectrum of an acetone solution of this compound shows a maximum absorption at 505 millimicrons with a molecular extinction coefficient of 31,300.

*Analysis.*—Calculated for $C_{19}H_{21}N_3O$: C, 74.2%; H, 6.9%; N, 13.7%. Found: C, 67.5%; H, 6.5%; N, 13.6%.

EXAMPLE V

Part A

Cyanoacetamide is substituted for malononitrile in the procedure of Part A of Example I and there is obtained 1 - carbamyl-4-(p-dimethylaminophenyl)-1,3-butadiene-1-carbonitrile, M. P. 234–236° C. The light absorption spectrum of an ethanol solution of this compound shows a maximum absorption at 450 millimicrons with a molecular extinction coefficient of 30,200.

Part B

By a procedure similar to that of Part B in Example I, 1-carbamyl-4-(p-dimethylaminophenyl) - 1,3 - butadiene-1-carbonitrile is converted to 1-carbamyl-4-(p-dimethylaminophenyl)-1,3-butadiene-1,2-dicarbonitrile. This latter compound gives red dyeings on hydrophobic fibers. The light absorption spectrum of an acetone solution of this compound shows a maximum absorption at 509 millimicrons with a molecular extinction coefficient of 47,600.

EXAMPLE VI

Part A 3-methyl-1-phenyl-5-pyrazolone is substituted for malononitrile in the procedure of Part A, Example 1, and there is obtained 4-(p-dimethylaminocinnamylidene)-3-methyl-1-phenyl-5-pyrazolone, M. P. 161–162° C.

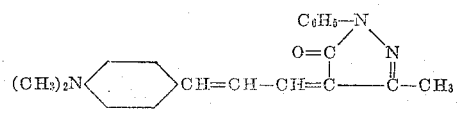

The light absorption spectrum of an acetone solution of this compound shows a maximum absorption at 483 millimicrons with a molecular extinction coefficient of 43,400.

Part B

By a procedure similar to that of Part B in Example I, 4-(p-dimethylaminocinnamylidene)-3-methyl-1-phenyl-5-pyrazolone is converted to 4-(α-cyano-p-dimethylaminocinnamylidene)-3-methyl-1-phenyl-5-pyrazolone.

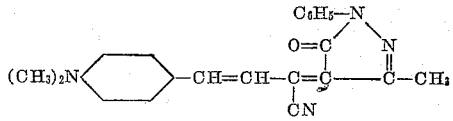

This can alternatively be named 4-[1-cyano-3-(p-dimethylaminophenyl)allylidene]-3-methyl - 1 - phenyl - 5-pyrazolone. This latter compound has a melting point of 122–128° C. and gives blue dyeings on hydrophobic fibers. The light absorption spectrum of an acetone solution of this compound shows a maximum absorption at 578 millimicrons with a molecular extinction coefficient of 5,700. The half-life of this compound in water at pH 4 and 100° C. is 18 hours.

*Analysis.*—Calculated for $C_{22}H_{20}N_4O$: C, 74.0%; H, 5.7%; N, 15.7%. Found: C, 70.2%; H, 5.4%; N, 13.1%.

The products embraced by the present invention are further illustrated as follows. When 2,4-dinitrobenzyl-p-tolylsulfone (Shriner and Greenlee, J. Org. Chem. 4, 242–51 (1939)) is substituted for malononitrile in the procedure for Part A of Example I, there is obtained 4-(p-dimethylaminophenyl)-1-(2,4-dinitrophenyl) - 1-(p-tolylsulfonyl)-1,3-butadiene which by the addition of hydrogen cyanide, followed by oxidation in a procedure similar to that of Part B of Example I, is converted to 4-(p-dimethylaminophenyl)-1-(2,4-dinitrophenyl) -1 -(p-tolylsulfonyl) 1,3-butadiene-2-carbonitrile.

In another embodiment N,N-bis(β-cyanoethyl)aniline (Braunholtz and Mann, J. Chem. Soc. 1953, 1817) is converted to p-bis-(β-cyanoethyl)aminobenzaldehyde by the action of dimethylformamide and phosphorus oxychloride. p-Bis-(β-cyanoethyl)aminobenzaldehyde is further treated with acetaldehyde in the presence of a base to yield p - bis - (β - cyanoethyl)aminocinnamaldehyde. When this latter compound is substituted for p-dimethylaminocinnamaldehyde in the procedure of Part A of Example I, there is obtained 4-[p-bis-(β-cyanoethyl)aminophenyl]-1,3-butadiene-1,1-dicarbonitrile which, by the addition of hydrogen cyanide, followed by oxidative dehydrogenation, in a procedure similar to that of Part B of Example I, is converted to 4-[p-bis-(β-cyanoethyl) aminophenyl]-1,3-butadiene-1,1,2-tricarbonitrile.

In a like manner, N, N-bis-(β-hydroxyethyl)aniline (Knorr, Ber. 22, 2093) is converted to p-bis-(β-hydroxyethyl)aminocinnamaldehyde which, when substituted for p-dimethylaminocinnamaldehyde in Example I, yields as a final product 4-[p-bis-(β-hydroxyethyl)aminophenyl]-1,3-butadiene-1,1,2-tricarbonitrile.

When o-dimethylaminocinnamaldehyde and 1,3-hydrindanedione react in the presence of piperidine and acetic acid in alcohol solution according to the process of Part A of Example I, there is obtained 2-(o-dimethylaminocinnamylidene)-1,3-hydrindanedione, which by the addition of hydrogen cyanide, followed by oxidative dehydrogenation in a procedure similar to that of Part B of Example I is converted to 2-(α-cyano-o-dimethylaminocinnamylidene)-1,3-hydrindanedione.

In a series of reactions identical to those noted in the preceding paragraph, except that 1,3-cyclopentanedione is used in place of 1,3-hydrindanedione, there is first obtained 2-(o-dimethylaminocinnamylidene)-1,3-cyclopentanedione which in turn yields 2-(α-cyano-o-dimethylaminocinnamylidene)-1,3-cyclopentanedione by the process of the present invention.

A preferred class of the 4-(aminoaryl)-1,3-butadiene-2-carbonitriles of the present invention include the 4-(aminoaryl)-1-(mono- and disubstituted)-1,3-butadiene-2-carbonitriles in which the substituents on the No. 1 carbon atom of the butadiene are bonded to said No. 1 butadiene carbon from an atom of the substituent which atom is itself multiply bonded to another atom of the substituent. These substituents include —CN, —COOR, —COZ, —COR, —SO₂R, Aryl, and substituted Aryl, including 1,1-disubstituted compounds in which the No. 1 butadiene carbon is bonded directly to two atoms (each also carrying a plural bond) which are members of a diradical which forms, with the No. 1 carbon atom of the butadiene, a cyclic structure. In the above R is an alkyl radical and Z is amido, including mono- and disubstituted amido.

A particularly preferred class is that of the 4-di-loweralkylaminoaryl-1,3-butadiene-2-carbonitriles having on the No. 1 butadiene carbon one or more substituents bonded to the No. 1 butadiene carbon from a multiply bonded carbon of the substituent. Such substituents are the cyano of Examples I, II, III, IV, the RCO of Example II, the carbamyl of Examples III, V, and VI, the carbalkoxy of Example IV. These substituents are groups hydrolyzable to carboxyl and a neutral to basic second component.

The products of the present invention are compounds of the formula $$YArCH=CHC(CN)=CH_nX_{2-n}$$

where Y is amino, Ar is an aromatic hydrocarbon diradical (i. e., phenylene, naphthylene, anthrylene), $n$ is 0, 1 or 2 and X may be any one of the substituents on the No. 1 carbon atom of the butadiene noted in the preceding paragraph, including compounds in which the two X's are alike or different when $n$ equals 0.

Of the compounds indicated by the above formula, those are preferred in which X is bonded through a carbon atom carrying a plural bond as in CN, COOR, and COZ. These substituents are all hydrolyzable to carboxyl.

In the first step of the process of the present invention, hydrogen cyanide is added to a 4-(p-aminoaryl)-1,3-butadiene to yield the corresponding 4-(p-aminoaryl)-3-butene-2-carbonitrile. The position occupied by the carbonitrile group in these products is in agreement with work summarized by Michael and Werner (J. Am. Chem. Soc. 59, 744 (1937)) to the effect that the primary product obtained from cinnamalmalonic methyl ester and potassium cyanide was 4-phenyl-1,1-bis-(carbomethoxy)-3-butene-2-carbonitrile.

It is also in agreement with the finding that hydrolysis of 4-(p-dimethylaminophenyl)-1,3-butadiene-1,1,2-tricarbonitrile with aqueous ethanolic sodium hydroxide followed by treatment of the hydrolysis product with methanolic hydrogen chloride gives methyl p-dimethylaminocinnamate.

This first step of the present invention is preferably carried out by bringing together the selected 4-(p-aminoaryl)-1,3-butadiene with a solution of a cyanide of an alkali metal (sodium cyanide, potassium cyanide, etc.) in an aqueous medium which may also contain water-miscible organic solvents, such as alcohols, ketones or formamides. The reaction takes place spontaneously at room temperature, but for convenience in bringing the reaction to completion in a short time the reaction mixture may be heated at temperatures up to 100° C. Isolation and/or purification of the 4-(p-aminoaryl)-3-butene-2-carbonitrile before proceeding with the next step of the process is optional.

In the second step of the process of the present invention, the 4-(p-aminoaryl)-3-butene-2-carbonitrile is subjected to oxidative dehydrogenation by the action of an oxidizing agent. For example, air, oxygen, calcium hypochlorite, chloranil, N-bromosuccinimide, benzoyl peroxide, lead tetraacetate or red lead oxide may be used. This step of the reaction is suitably carried out in the presence of an acidic aqueous medium. The reaction takes place spontaneously at room temperature. Care must be exercised not to prolong the action of the oxidizing agent unduly after the desired 4-(p-aminoaryl)-1,3-butadiene-2-carbonitrile has been formed lest some of this product be consumed by further oxidation.

Furthermore, it is desirable to use stoichiometric amounts, or not more than ten percent in excess thereof, of the oxidizing agent. To minimize decomposition of reactants and products it is further preferred that the reaction mixture in which the oxidative dehydrogenation takes place be such that, on diluting one volume of said mixture with nine volumes of water there is obtained a mixture in which the hydrogen ion concentration is not less than $10^{-12}$ molar and not more than 1 molar.

The 4-(p-aminoaryl 1)-1,3-butadiene-2-carbonitriles are useful as dyes for cellulose acetate and hydrophobic fibers, e. g., "Dacron" polyester fibers and "Orlon" acrylic fibers. It is preferred to carry out the dyeing in a mildly acidic aqueous medium. For example, a solution of 1.5 parts of 4-(p-dimethylaminophenyl)-1,3-butadiene-1,1,2-tricarbonitrile and 1.5 parts of "Marasperse CB" (a sulfonated lignin) in 500 parts of ethylene glycol monomethyl ether is added with stirring to 4000 parts of boiling water previously adjusted to pH 4 by addition of acetic acid. To the resultant dye suspension is added 100 parts of "Dacron" polyester yarn. The suspension is boiled one hour, after which the yarn, now dyed a violet color, is withdrawn, washed well with water, and dried.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows.

We claim:

1. A compound of the formula:

$$ZArCH=CHC(CN)=CH_nX_{2-n}$$

in which Z is an amino radical separated from the butadienyl by an even number, from two to four, of annular carbons, Ar is an aromatic hydrocarbon diradical, $n$ is an integer from 0 to 1, and X is a substituent from the group consisting of cyano, benzoyl, carbamyl and carbalkoxy substituents.

2. 1,1-disubstituted-4-di-loweralkylaminoaryl-1,3-butadiene-2-carbonitrile wherein the amino substituent is separated from the 4-carbon of the butadiene by an even number, from two to four, of annular carbons, the aryl group is an aromatic hydrocarbon diradical, and the 1-substituents are selected from the group consisting of cyano, benzoyl, carbamyl, and carbalkoxy substituents.

3. 4-(p-dimethylaminophenyl)-1,3-butadiene-1,1,2-tricarbonitrile.

4. Process of preparing a 4-(aminoaryl)-1-3-butadiene-2-carbonitrile which comprises hydrocyanating a 4-(aminoaryl)-1,3-butadiene wherein the aryl group is an aromatic hydrocarbon diradical and the amino and butadienyl substituents are separated by an even number, from two to four, of annular carbons to form a 4-(aminoaryl)-3-butene-2-carbonitrile and then subjecting said 4-(aminoaryl)-3-butene-2-carbonitrile to oxidative dehydrogenation to form the corresponding 4-(aminoaryl)-1,3-butadiene-2-carbonitrile.

5. Process of preparing a 4-(aminoaryl)-1,3-butadiene-2-carbonitrile which comprises reacting a 4-(aminoaryl)-1,3-butadiene wherein the aryl group is an aromatic hydrocarbon diradical and the amino and butadienyl substituents are separated by an even number, from two to four, of annular carbons with an alkali cyanide to form a 4-(aminoaryl)-3-butene-2-carbonitrile and then subjecting said 4-(aminoaryl)-3-butene-2-carbonitrile to the action of an oxidizing agent in an acid medium to form the corresponding 4-(aminoaryl)-1,3-butadiene-2-carbonitrile.

References Cited in the file of this patent
UNITED STATES PATENTS

| | | |
|---|---|---|
| 2,328,890 | Clifford et al. | Sept. 7, 1943 |
| 2,509,859 | Coffmann et al. | May 30, 1950 |
| 2,554,484 | Loder | May 29, 1951 |
| 2,666,780 | Arthur et al. | Jan. 19, 1954 |
| 2,701,260 | Hagemeyer | Feb. 1, 1955 |